United States Patent
Nakamoto et al.

(10) Patent No.: US 10,137,934 B2
(45) Date of Patent: Nov. 27, 2018

(54) VEHICLE BODY FRONT STRUCTURE

(71) Applicant: HONDA MOTOR CO., LTD., Tokyo (JP)

(72) Inventors: Naoki Nakamoto, Wako (JP); Yuki Matsushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 15/390,864

(22) Filed: Dec. 27, 2016

(65) Prior Publication Data

US 2017/0197661 A1    Jul. 13, 2017

(30) Foreign Application Priority Data

Jan. 7, 2016   (JP) ................................ 2016-002028

(51) Int. Cl.
*B60N 99/00* (2006.01)
*B62D 21/15* (2006.01)
*B62D 25/08* (2006.01)

(52) U.S. Cl.
CPC ........... *B62D 21/152* (2013.01); *B62D 25/08* (2013.01); *B60Y 2306/01* (2013.01); *B60Y 2410/124* (2013.01)

(58) Field of Classification Search
CPC .. B62D 21/152; B62D 25/08; B60Y 2306/01; B60Y 2410/124
See application file for complete search history.

(56) References Cited

U.S. PATENT DOCUMENTS

| 2011/0272971 | A1* | 11/2011 | Kihara | ............... | B62D 25/082 296/203.02 |
| 2017/0088180 | A1* | 3/2017 | Takeda | ............... | B62D 21/152 |

FOREIGN PATENT DOCUMENTS

| JP | 4-310477 A | 11/1992 |
| JP | 7-101354 A | 4/1995 |
| JP | 2001-260938 A | 9/2001 |
| JP | 4881936 B2 | 2/2012 |
| JP | 5377650 B2 | 12/2013 |

OTHER PUBLICATIONS

Office Action dated Oct. 3, 2017, issued in counterpart Japanese Application No. 2016-002028, with English translation (5 pages).
Office Action dated Jul. 23, 2018, issued in counterpart Chinese Application No. 201611110787.2, with English machine translation. (14 pages).

* cited by examiner

*Primary Examiner* — Lori L Lyjak
(74) *Attorney, Agent, or Firm* — Westerman, Hattori, Daniels & Adrian, LLP

(57) ABSTRACT

A vehicle body front structure includes a front side frame body provided on the front portion of the vehicle body, the front side frame including a front frame extending to the longitudinal direction and a rear frame extending downward from the rear end portion of the front frame to the rear direction, the rear portion of the front frame has a front bulkhead and a rear bulkhead which are longitudinally spaced from each other, a recessed portion which recesses the outside wall outside in the width direction of the vehicle to the inside in the width direction of the vehicle, and the recessed portion is positioned between the front bulkhead and the rear bulkhead.

13 Claims, 6 Drawing Sheets

VEHICLE BODY FRONT STRUCTURE

CROSS REFERENCES TO RELATED APPLICATION

The present application claims priority under 35 USC 119 to Japanese Patent application No. 2016-002028, filed Jan. 7, 2016 entitled "Vehicle Body Front Structure." The contents of this application are incorporated herein by reference in their entirety.

TECHNICAL FIELD

The present disclosure relates to a vehicle body front structure.

BACKGROUND

Vehicles including automobile have right and left of front side frames extending in the longitudinal direction.

The front side frame is a member which comprises a front frame extending in the longitudinal direction and located on an inner side of a front wheel in the width direction of the vehicle and a rear frame extending backward from the rear end portion of the front frame to the lower direction and positioned below the floor.

Moreover, as for the front side frame, (for example, in Japanese Patent No. 4881936 and Japanese Patent No. 5377650), the front frame has a stiffener at the rear end portion (hereinafter, in some cases, it is called a connecting portion) of the front frame where the rear-frame is connected to the front frame, which increases the rigidity of connecting portion.

In addition, the above-mentioned stiffener extends further frontward than the connecting portion, which increases the rigidity of the whole rear portion of the front frame.

SUMMARY

These days, there are researches and developments on vehicle body front structure which can absorb the collision energy when the vehicle is collided from the front direction.

Accordingly, when the collision load is applied from the front direction on the rear portion of the front frame, it is preferable that the rear portion of the front frame can bend in the width direction of the vehicle to absorb the collision energy.

However, the rear portion of the front frame in the above mentioned Japanese Patent No. 4881936 and Japanese Patent No. 5377650 has a high rigidity, and hardly bends to the outside in the width direction of the vehicle when the collision load from frontward is applied.

Therefore, one embodiment provides a vehicle body front structure in which the front frame bends certainly to the outside in the width direction when the vehicle is collided from the front direction.

In one aspect, a vehicle body front structure includes a front side frame provided on the front portion of the vehicle body, the front side frame includes a front frame extending to the longitudinal direction and a rear frame extending downward from the rear end portion of the front frame to the rear direction, the rear portion of the front frame has a front bulkhead and a rear bulkhead which are longitudinally separated from each other, a recessed portion which recesses the outside wall in the outside in the width direction of the vehicle to the inside in the width direction of the vehicle, and the recessed portion is positioned between the front bulkhead and the rear bulkhead.

Accordingly when the collision load from frontward is applied on the rear portion of the front frame, the stress (compressive stress) concentrates OR the recessed portion (outside wall). Accordingly, the further front side portion than the recessed portion bends at the recessed portion as a starting point bends to the outside in the width direction of the vehicle.

Moreover, the recessed portion is positioned between the front bulkhead and the rear bulkhead, which prevents the front bulkhead and the rear bulkhead from hindering the above-mentioned deformation (bending to the outside in the width direction of the vehicle).

Furthermore, the front bulkhead and the rear bulkhead increases the rigidity in front of and behind the recessed portion, more stress concentrates on the recessed portion.

As mentioned above, the rear portion of the front frame certainly bends to the outside in the width direction of the vehicle when the vehicle is collided from the front direction, which can absorb the collision energy.

Moreover, it is preferable that a mount bracket for attaching the sub frame is provided at the position below the front frame and corresponding to the front bulkhead, and the front bulkhead has an approximately C-shape in the plain view, is extended to the vertical direction, and at least is combined with the lower wall, the upper wall part, and the inside wall of the front frame.

According to the configuration, the rigidity or the part where is in front of the recessed portion further increases, more stress concentrates on the recessed portion, which facilitates bending to the outside in the width direction of the vehicle.

Moreover, the part where the front bulkhead is provided on the front frame, namely, the rigidity increases at the part where the sub frame is supported, and the sub frame is stably supported on the front frame.

Moreover, it is preferable that the rear bulkhead is an approximately L-shaped member in the side view, which has a vertical wall extending inside the rear portion of the front frame to the vertical direction, a lateral wall extending downward from the lower end of the vertical wall to the rear direction. The vertical wall combines with the upper wall, the lower wall, the inside wall, and the outside wall of the front frame, respectively. The lateral wall combines with at least the outside wall, and the inside wall on the wall portion of the rear frame.

According to the configuration, the rear bulkhead is provided from the rear portion of the front frame to the rear frame, the rigidity of the connecting portion between the front frame and the rear frame increases. Accordingly, even if the vehicle is collided from the front direction, the connecting portion hardly deforms, which keeps the angle in the angular shape formed with and between the front frame and the rear frame. Accordingly, it is suppressed that the connection portion is deformed to move the dash lower panel provided above the rear end of the front frame to the rear direction (the inside of the vehicle).

Moreover, it is preferable that a bead extending over the vertical wall and the lateral wall is formed on the rear bulkhead.

According to the configuration, the rigidity of an angular portion formed with the vertical wall and the lateral wall increases.

Therefore, when the vehicle is collided from the front direction, the angle formed with the vertical wall and the lateral wall hardly changes, the angle formed with the front frame combined with the vertical wall and the rear frame combined with the lateral wall can be kept. As a result, it is suppressed that the connecting portion is deformed to move the dash lower panel provided above the rear end of the front frame to the rear direction (the inside of the vehicle).

Moreover, it is preferable that the front frame has, in order from the front, a clearance portion for avoiding the contact with a wheel disposed outside in the width direction of the vehicle, a front bending portion bending to the inside in the width direction of the vehicle, and the recessed portion.

According to the configuration, the front frame alternately bends at the three points (the clearance portion, the front bending portion, and the recessed portion) in the width direction of the vehicle, which allows to efficiently absorb the collision energy.

Moreover, it is preferable that the load transmitting member extending to the outside in the width direction of the vehicle is provided on the front end portion of the front frame.

When a lapped rate at the collision is minute as a small overlap collision, the collision, load is input to the outer side in the width direction of the vehicle than the front frame.

However, according to the configuration, even in such a case, the front frame is deformed by the collision load input on the front frame through the load transmitting member, which can absorb the collision energy.

Moreover, it is preferable that the rear frame comprises: an inclined portion extending downward from a rear portion of the front frame to the rear direction; a horizontal portion horizontally extending from the rear end of the inclined portion to the rear direction, as the angular portion is formed with the inclined portion and the horizontal portion on the rear frame, a stiffener of the outrigger is provided outside of the rear bending portion in the width direction of the vehicle, a rear wall of the lateral member is provided inside of the rear bending portion in the width direction of the vehicle, the bending bulkhead is provided inside the rear bending portion so as to be arranged with the stiffener, the rear wall of the lateral member in the width direction of the vehicle.

According to the above-mentioned configuration, the stiffener, the rear wall of the lateral member and the bending bulkhead increase the rigidity of the rear bending portion. Accordingly, even if the vehicle is collided from the front direction, the angle formed by with the rear bending portion is kept, which suppresses the inclined portion to bend and face upward relative to the horizontal portion.

As a result, the clash lower panel is suppressed to move upward, to the rear side (inner side of the vehicle) by deforming the inclined, portion so as to face upward.

For example, in one aspect, when the vehicle is collided from the front direction of the vehicle, it is possible to provide the vehicle body front structure in which the rear portion of the front frame certainly bends to the outside in the width direction of the vehicle.

BRIEF DESCRIPTION OF THE DRAWINGS

The advantages of the disclosure will become apparent in the following description taken in conjunction with the following drawings.

DETAILED DESCRIPTION

Next, the embodiment of the vehicle which adopts the vehicle body front structure in the present disclosure will be explained with reference to the drawings.

Figure 1:
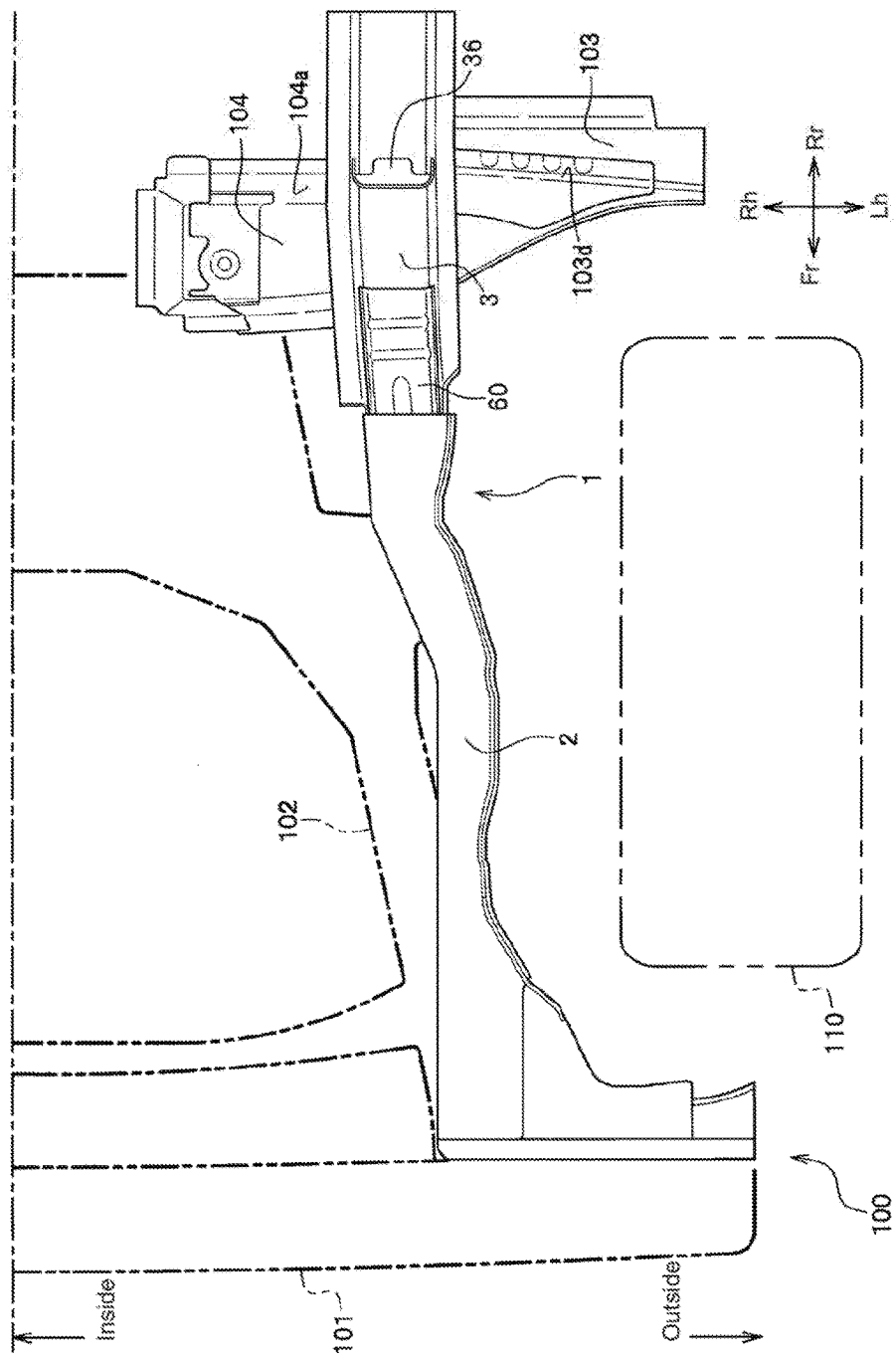
FIG. 1 is a plain view of the vehicle body front structure related to the embodiment.

As shown in FIG. 1, a vehicle 100 as a skeleton member of the body front portion has right and left front frames 1 (only the left side is shown) extending in the longitudinal direction and located on an inner side in the width direction of the vehicle of front wheels 110 (only the left side is shown), respectively, a bumper beam 101 fixed on the front side of the right and left front side frames 1 and bridged in the width direction of the vehicle, a sub frame 102 provided below the right and left front side frames 1, right and left outriggers 103 (only the left side is shown) extending from the rear portion of the right and left front side frames 1 to the outside in the width direction of the vehicle, respectively, right and left lateral members 104 (only the left side is shown) extending from the rear portions of the right and left front side frames 1 to the inside in the width direction of the vehicle, respectively.

Moreover, the right and left front side frames 1, the right and left outriggers 103, and the right and left lateral members 104 are symmetrically formed, respectively. Accordingly, the left side structure will be explained and the right side structure will be omitted in the following explanation.

Figure 2:
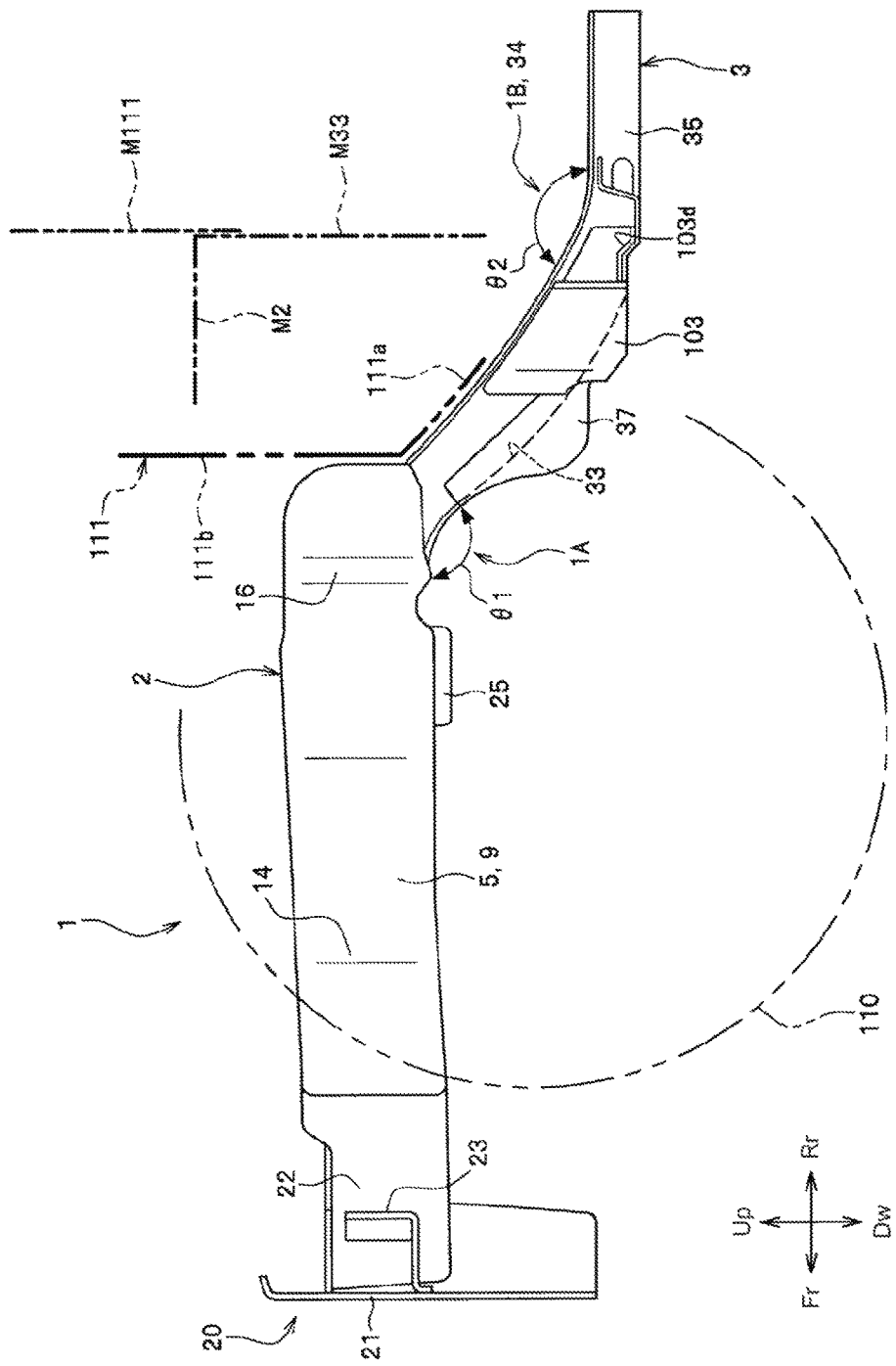
FIG. 2 is a left side view of the vehicle body front structure related to the embodiment.

As shown in FIG. 2, the front side frame 1 has a front frame 2 horizontally extending in the longitudinal direction, a rear frame 3 extending downward from the rear end portion of the front frame 2 to the rear direction and then horizontally extending to the rear direction.

Accordingly, the front side f raise 1 has a first angular portion 1A between the front frame 2 and the rear frame 3, simultaneously has a second angular portion 1B in the vicinity of the center of the rear frame 3, and as a whole, forms in a crank-shape such that the rear portion is positioned below the front portion.

Moreover, a lateral wall 111a of a dash lower panel 11 and ah unillustrated floor panel are provided above the rear frame 3, and a vertical wall 111b of the dash lower panel 111 partitions an engine room from a car compartment.

Figure 3:
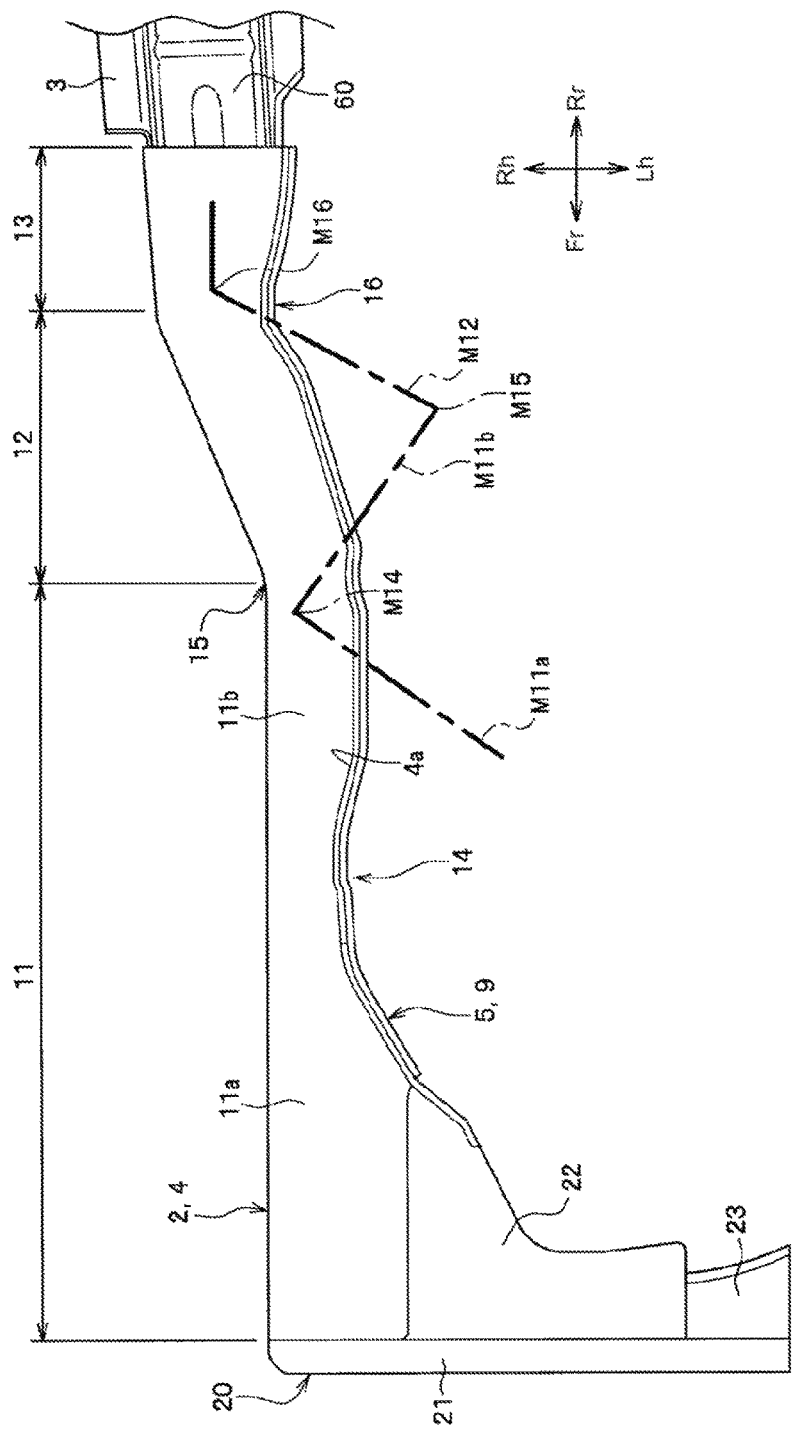
FIG. 3 is a plain view of the enlarged front frame.

As shown in FIG. 3, the front frame 2 has an inner frame 4, and an outer frame 5 disposed outside of the inner frame 4 in the width direction of the vehicle.

Figure 4:
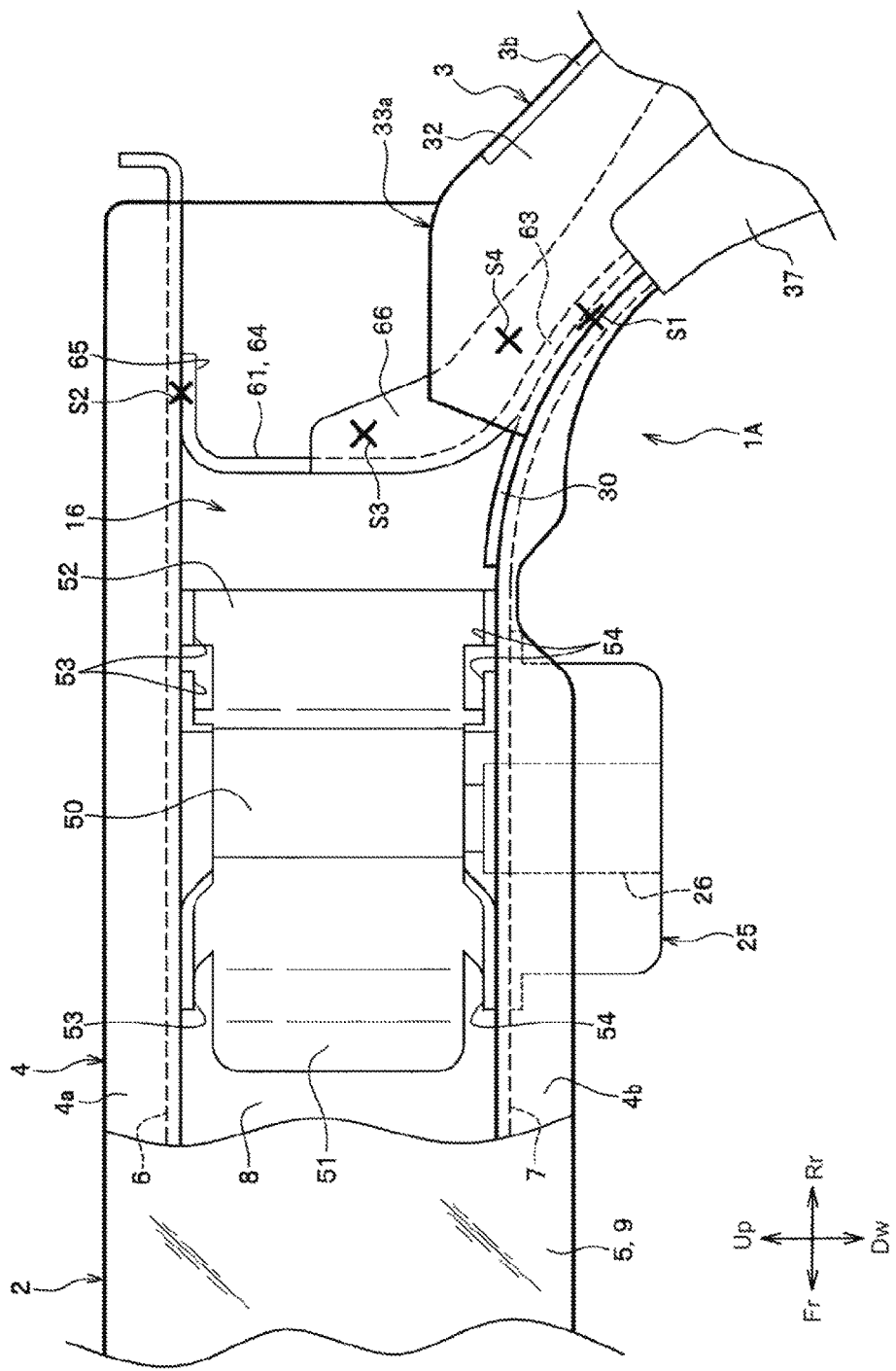
FIG. 4 is a left side view of the outside wall of the front frame in a partly-notched state.

As shown in FIG. 4, the inner frame 4 is an approximately C-shaped metal member in the cross sectional view, which opens to the outside in the width direction of the vehicle. Moreover, an upper flange 4a and a lower flange 4b are formed on the end portion of the inner frame 4.

The outer frame 5 is a thin plate like metal member (see FIG. 3), and welded to the upper flange 4a and the lower flange 4b, and covers the opening of the inner frame 4.

Accordingly, the front frame 2 has a closed cross sectional structure composed of an upper wall 6, a lower wall 7, an inside wall 8 and an outside wall 9.

As shown in FIG. 3, the front frame 2 has a first straight line portion 11 linearly extending in the longitudinal direction, a second straight line portion 12 linearly (obliquely)

extending from the rear end of the first straight line portion 11 to the inside in the width direction of the vehicle, and a connecting portion 13 which is the rear end portion of the front frame 2, approximately and linearly extends from the rear end of the second straight line portion 12 to the rear direction, and connects to the rear frame 3.

Moreover, the configuration with the second straight line portion 12 and the connecting portion 13 in the present embodiment may be one example of the rear portion of the front frame which is mentioned in Scope of Claim.

Moreover, in order from the front, a clearance portion 14, a front bending portion 15, and a recessed portion 16 are formed on the front frame 2.

The clearance portion 14 is recessed so as to prevent the front frame 2 from contacting with the front wheel 110 (see FIG. 1), and is formed such that the outside wall 9 of the middle portion of the first straight line portion 11 in the longitudinal direction is curved so as to be recessed to the inside in the width direction of the vehicle.

Accordingly, when the collision load from the front direction is applied on the front frame 2, the stress (compressive stress) easily concentrates on the clearance 14 (outside wall 9). Moreover, when the stress deforms (compresses) the clearance portion 14 (outside wall 9), the front portion 11a of the first straight line portion 11 bends at the clearance portion 14 as a starting point to the outside in the width direction of the vehicle (see a M11a shown in a two-dot chain line in FIG. 3), which absorbs the collision energy.

The front bending portion 15 is an angular portion which is formed, between the first straight line portion 11 and the second straight line portion 12.

Accordingly, when the collision load from the front direction is applied on the front frame 2, the stress (compressive stress) can easily concentrate on the front bending portion 15 (inside wall 8).

Moreover, when the stress deforms (compresses) the front bending portion 15 (inside wall 8), the rear portion 11b of the first straight line portion 11 bends at the front bending portion 15 as a starting point to the inside in the width direction of the vehicle (see a M11b shown in a two-dot chain line in FIG. 3), which absorbs the collision energy.

The recessed portion 16 is formed such that the outside wall 9 forming the rear portion of the second straight line portion 12 and the front portion of the connecting portion 13 is recessed to the inside in the width direction of the vehicle.

Accordingly, when the collision load from the front direction is applied on the front frame 2, the stress (compressive stress) can easily concentrate on the recessed portion 16 (outside wall 9).

Moreover, when the stress deforms (compresses) the recessed portion 16 (outside wall 9), the second straight line portion 12 bends at the recessed portion 16 (outside wall 9) as a starting point to the outside in the width direction of the vehicle (see a M12 shown in a two-dot chain line in FIG. 3), which absorbs the collision energy.

Moreover, the recessed portion 16 is positioned between the second straight line portion 12 and the connecting portion 13 bending relative to the second straight line portion 12, in other words, on the inner side of the angular portion. The stress can easily concentrate further on the recessed portion 16 (outside wall 9). Accordingly, the second straight line portion 12 bends at the recessed portion 16 as a starting point to the outside in the width direction of the vehicle with high certainty.

Then, the clearance portion 14, the front bending portion 15, and the recessed portion 16 alternately bend to the outside or the inside in the width direction of the vehicle, which efficiently absorbs the collision energy. In FIG. 3, the reference number M14 shows the clearance portion 14 after the deformation, the reference number M15 shows the front bending portion 15 after the deformation, and the reference number M16 shows the recessed portion 16 after the deformation.

The basic configuration of the front frame 2 is mentioned as above. Next, the members which are provided on the front frame 2 will be explained.

As shown in FIG. 3, a load transmitting member 20 extending to the width direction of the vehicle is provided on the front end of the front frame 2.

The load transmitting member 20 has a plate-like plate portion 21 combined with the front end of the front frame 2 and extending to the outside in the width direction of the vehicle, a first stiffening portion 22 joined to the left side of the front end portion of the front frame 2 and supporting the plate portion 21 from the rear direction, and a second stiffening portion 23 joined to the left side of the first stiffening portion 22 and supporting the vicinity of the end portion of the plate portion 21 from the rear direction.

Moreover, a rear wall 22a of the first stiffening portion 22 is formed so as to be inclined to the rear direction as the rear wall approaches to the inside, in the width direction of the vehicle.

As mentioned above, in the case of a small overlap collision in which the collision load is input to the outside of the front side frame 1 in the width direction of the vehicle, the collision load is certainly input to the front side frame 1 through the load transmitting member 20.

As shown in FIG. 4, a mount bracket 25 for attaching a sub frame 102 (see FIG. 1) is provided on the lower wall 7 forming the second straight line portion 12.

The mount bracket 25 has a nut portion 26, and simultaneously joins to the second straight line portion 12 by welded to the lower surface of the lower wall 7.

Moreover, the sub frame 102 is positioned below the mount bracket 25, and simultaneously is attached to the mount bracket 25 by fastened with an unillustrated bolt which is screwed with the nut portion 26 from the lower direction.

Figure 5:
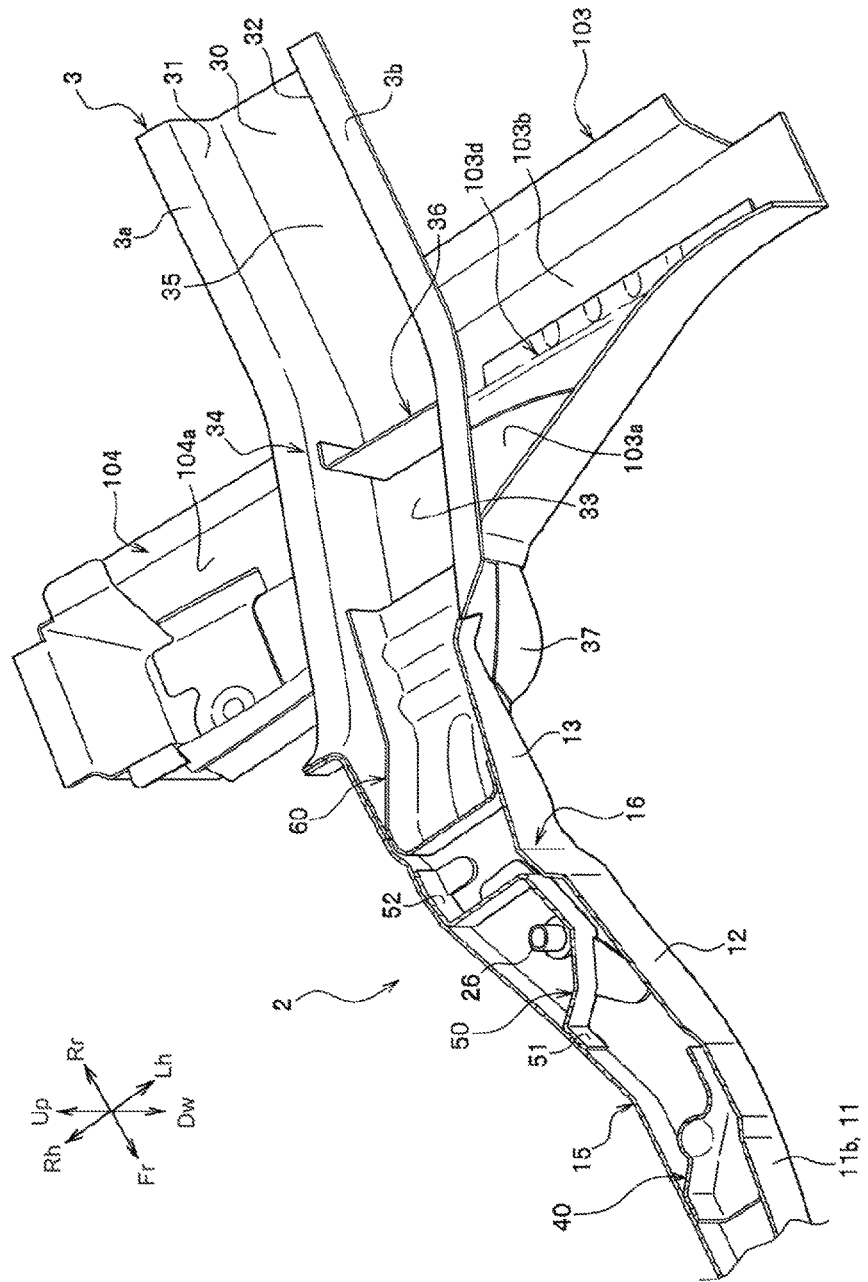
FIG. 5 is a perspective view of the upper wall of the front frame in a notched state from the front direction and the upper direction in the left side.

As shown in FIG. 5, in order from the front, a bulkhead 40 for the first straight line portion, a front bulkhead 501 and a rear bulkhead 60 are provided inside the front frame 2.

The bulkhead 40 for the first straight line portion is a metal member which is provided inside the rear portion 11b of the first straight line portion 11, and increases the rigidity of the rear portion 11b of the first straight line portion 11.

Moreover, the bulkhead 40 for the first straight line portion is positioned behind the clearance portion 14 and in front of the front bending portion 15, which does not prevent the clearance portion 14 and the front bending portion 15 as a starting point from bending.

Moreover, the detail of the front bulkhead 50 and the rear bulkhead 60 is described later. Next, the rear frame 3 will be explained.

As shown in FIG. 5, the rear frame 3 has a lower wall 30, an inside wall 31 and an outside wall 32, and is an approximately C-shaped metal member in the cross section, which is opened to the upper direction.

The rear frame 3 has a closed cross sectional structure such that a flange 3a and a flange 3b are formed, and the lateral wall 111a (see FIG. 2) of the dash lower panel 111 disposed above and the unillustrated floor panel are welded.

The rear frame 3 has an inclined portion 33 extending downward from the connecting portion 13 of the front frame 2 to the rear direction, a horizontal portion 35 horizontally extending from the rear end of the inclined portion 33 to the rear direction. Accordingly, a rear bending portion 34 which is an angular portion formed with the inclined portion 33 and the horizontal portion 35 is formed on the rear frame 3.

As shown in FIG. 4, a front end portion 33a of the inclined portion 33 is disposed inside the connecting portion 13 of the front frame 2. Moreover, the lower wall 7 forming the connecting portion 13 is inclined downward along the inclined portion 33 to the rear direction.

Then, the lower wall 30, the inside wall 31 (not shown in FIG. 4) and the outside wall 32 which forms the front end portion 33a of inclined portion 33 are welded to the lower wall 7, the inside wall 8, and the outside wall 9 which forms the connecting portion 13, respectively. The front frame 2 and the rear frame 3 are joined.

Accordingly, the connecting portion 13 and the front end portion 33a of the inclined portion 33 forms the above-mentioned first angular portion 1A. When the collision load is applied from the front direction, the stress (compressive stress) can easily concentrate on the inside of the first angular portion 1A (the lower wall 7 of the connecting portion 13, and the lower wall 30 of the inclined portion 33).

In addition, an inclined portion stiffening member 37 bulging to the front side is provided on the lower surface of the inclined portion 33, which increases the rigidity.

As shown in FIG. 2, the rear bending portion 34 forms the second angular portion 1B. Accordingly, when the collision load is applied from the front direction, the stress can easily concentrate so as to compress the floor panel which joins to the inside of the rear bending portion 34 (the second angular portion 1B).

Moreover, a bending bulkhead 36 is provided inside the rear bending portion 34 (see FIG. 5). The detail of the bending bulkhead 36 will be described later.

An outrigger 103 connects an unillustrated side sill which is disposed outside of the rear frame 3 in the width direction of the vehicle and the rear frame 3. Accordingly, the collision load applied on the rear frame 3 is dispersed with the unillustrated side sill through the outrigger 103.

The outrigger 103 extends to the width direction of the vehicle has an approximately hat-shape which is opened, upward in the cross sectional view, and has a closed cross sectional structure such that the floor panel is joined to the upper portion.

Moreover, the bottom wall of the outrigger 103 forms a step-shape, and has a front bottom wall 103a and a rear bottom wall 103b.

Then, a stiffener 103d which straddles and combines with the front bottom wall 103a, the rear bottom wall 103b, and a vertical wall (not shown) positioned between the first bottom wall 103a and the rear-bottom wall 103d is provided on the outrigger 103, which increase the rigidity.

Moreover, the stiffener 103d extends in the width direction of the vehicle, the end portion thereof inside in the width direction of the vehicle joins to the outside wall 32 forming the rear bending portion 34 of the rear frame 3.

A lateral member 104 connects an unillustrated floor frame disposed inside the rear frame 3 in the width direction of the vehicle and the rear frame 3. Accordingly, the collision load applied on the rear frame 3 is dispersed with the unillustrated floor frame through the lateral member 104.

The lateral member 104 extends in the width direction of the vehicle, has a closed cross sectional structure so as to extend in the width direction of the vehicle and has an approximately hat-shape which is opened upward in the cross sectional view, and joins the floor panel located above.

A rear wall 104a of the lateral member 104 joins to the inside wall 31 forming the rear bending portion 34 of the rear frame 3.

Next, the detail of the front bulkhead 50, the rear bulkhead 60, and the bending bulkhead 36 will be explained.

As shown in FIG. 5, the front bulkhead 50 is provided inside the second straight line portion 12 of the front frame 2. The rear bulkhead 60 is provided inside the connecting portion 13 of the front frame 2.

Moreover, the front bulkhead 50 and the rear bulkhead 60 are longitudinally separated from each other, the recessed portion 16 is disposed between the front bulkhead 50 and the rear bulkhead 60.

Accordingly, while the bulkheads 50, 60 may enhance the rigidity of the front frame 2, the rigidity in the vicinity of the border between the second straight line portion 12 and the connecting portion 13, namely, the rigidity of the recessed portion 16 is not enhanced.

In short, the front bulkhead 50 and the rear bulkhead 60 do not prevent the second straight line portion 12 (bending to the outside in the width direction of the vehicle. See M2 in FIG. 2) from deforming, when the collision load is applied from the front direction.

Moreover, according to the front bulkhead 50 and the rear bulkhead 60, the rigidity behind and in front of the recessed portion 16 increases, the stress (compressive stress) can easily concentrate on the recessed portion 16 (outside wall 9), which promotes that the second straight line portion 12 bends at the recessed portion 16 as a starting point to the outside in the width direction of the vehicle.

As shown in FIG. 5, the front bulkhead 50 is an approximately C-shaped metal member in the cross section which opens to the outside in the width direction of the vehicle Moreover, a front welded piece 51 is formed on the front end of the front, bulkhead 50 as to extend to the front direction and be welded to the inside wall 8. A rear welded piece 52 is formed on the rear end of the front bulkhead as to extend to the rear, direction and be welded to the inside wall. Furthermore, a plurality of upper welded pieces 53 extending to the vertical direction and simultaneously welded to the upper wall 6 of the front frame 2 (see FIG. 4), and a plurality of lower welded pieces 54 welded to the lower wall 7 are formed on the front bulkhead 50.

Accordingly, the front bulkhead 50 joins to three wall portions forming the second straight line portion 12 (the upper wall 6, the lower wall 7, and the inside wall 8), which largely increases the rigidity of the second straight line portion 12. As a result, when the collision load from the front direction is applied, the stress further concentrates on the recessed portion 16, which promotes bending to the outside in the width direction of the vehicle.

Moreover, as shown in FIG. 4, the front bulkhead 50 is positioned above the mount bracket 25, and provided so as to correspond to the mount bracket 25.

Accordingly, as for the second straight line portion 12, the supporting rigidity for supporting the sub frame 102 is improved, which can stably support the sub frame 102.

Figure 6:
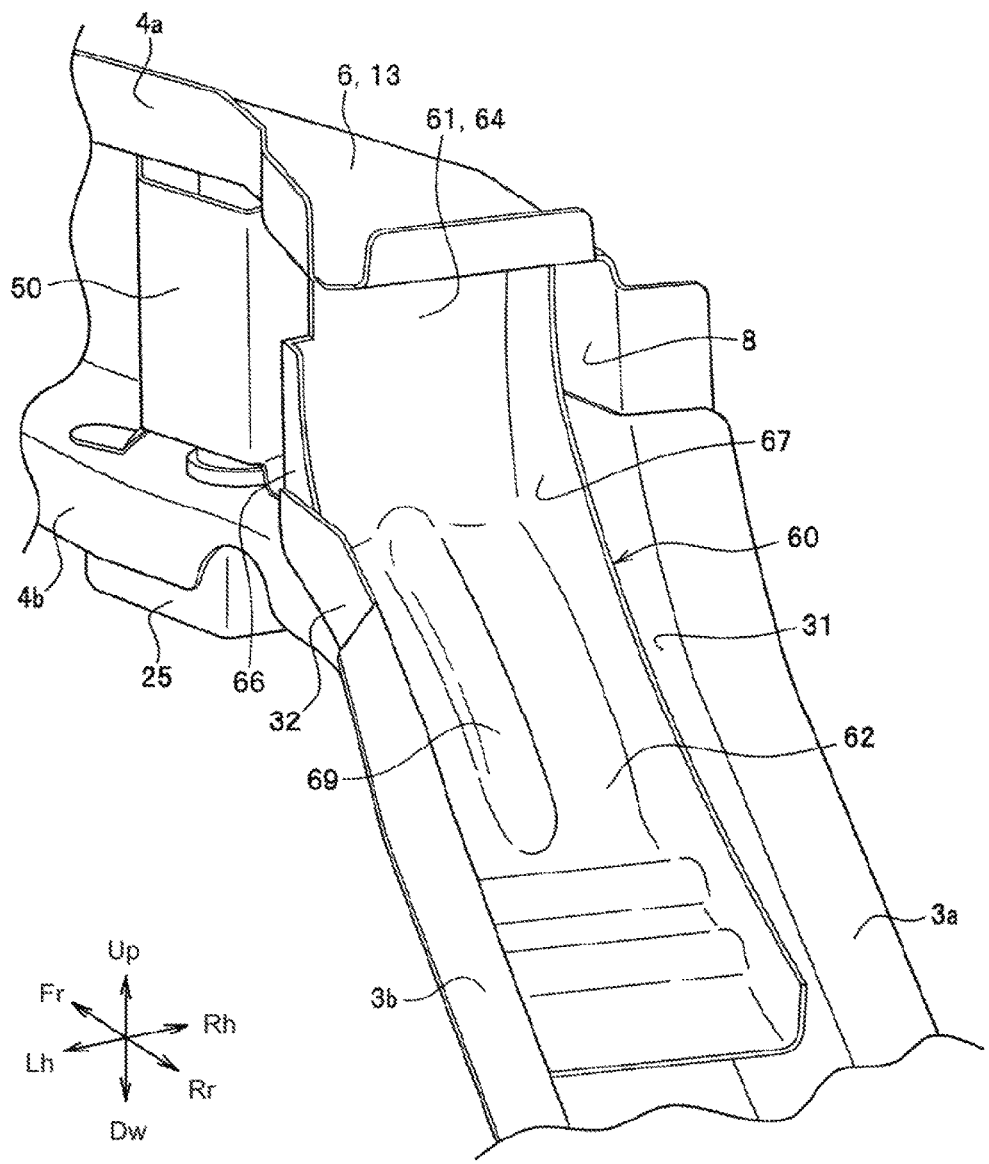
FIG. 6 is a perspective view of the connecting part of the inner frame and the rear frame from the rear direction in the left side.

As shown in FIGS. 4 to 6, the rear bulkhead 60 is an approximately L-shaped metal component in the side view, which has a vertical wall 61 extending in the vertical direction inside the connecting portion 13 of the front frame 2, a lateral wall 62 extending downward from the lower end of the vertical wall 61 to the rear direction and disposed, inside the rear frame 3.

Moreover, the rear bulkhead 60 is press molded.

As shown in FIG. 4, the vertical wall 61 has a lower vertical wall 63 inclined and extended along the lower wall 7 of the connecting portion 13, a vertical wall main body 64 extending from the lower-vertical wall 63 to the upper direction, an upper vertical wall 65 extending from the upper end of the vertical wall main body 64 to the rear direction along upper wall 6 of the connecting portion 13, a left vertical wall 66 and a right vertical wall 67 extending backward from the right and left of side portions of the lower vertical wall 63 and the vertical wall main body 64 (not shown in FIG. 4, see FIG. 6).

Then, the lower vertical wall. 63 is three-ply welded to the lower wall 7 of the connecting portion 13 and the lower wall 30 of the rear frame 3 (see S1 in FIG. 4).

The upper vertical wall 65 is welded to the upper wall 6 of the connecting portion 13 (see S2 in FIG. 4).

The left vertical wall 66 is welded to the outside wall 9 of the connecting portion 13 at the upper side (see S3 in FIG. 4). The lower side of the left vertical wall is three-ply welded to the outside wall 9 of the connecting portion 13 and the lateral wall 32 of the rear frame 3 (see S4 in FIG. 4).

As shown in FIG. 6, the upper side of the right vertical wall 67 is welded to the inside wall 8 of the connecting portion 13. The lower side of the right vertical wall is three-ply welded to the inside wall 8 of the connecting portion 13 and the inside wall 31 of the rear frame 3.

As shown in FIG. 6, the lateral wall 62 extends along the lower wall 30 of the inclined portion 33 of the rear frame 3, and simultaneously is welded to the lower wall 30

The left vertical wall 66, a left lateral wall (not shown) connecting to the right vertical wall 67, and a right, lateral wall 68 are formed on the side portion of the lateral wall 62.

Then, the left side wall and the right lateral wall 68 are welded to the inside wall 31 and the outside wall 32 forming the inclined portion 33 of the rear frame 3.

As mentioned above, according to the rear bulkhead 60, the rigidity of the first angular portion 1A composed of the connecting portion 13 and the front end portion 33a of the inclined portion 33 is largely improved.

Accordingly, it is suppressed that the collision load from the front direction makes the first angular portion 1A composed of the front frame 2 and the rear frame 3 smaller to deform the dash lower panel 111 to the inside of the vehicle.

Namely, it can be suppressed that the inside of the first angular-portion 1A (the lower wall 7 of the connecting portion 13 and the lower wall 30 of the inclined portion 33) is compressed, and an angle θ1 (see FIG. 2) of the first, angular portion 1A becomes smaller even if the collision load from the front direction is applied.

Moreover, as shown in FIG. 6, a bead 69 extending over the vertical wall 61 and the lateral wall 62 is formed so as to bulge on the rear bulkhead 60 of the present embodiment.

Accordingly, the rigidity of the first angular portion 1A is further improved, which certainly keeps the angle θ1 (see in FIG. 2) of the first, angular portion 1A, and simultaneously can suppress the spring-back (curvature deformation) by press molding.

Next, the bending bulkhead 36 will be explained.

As shown in FIG. 5, the bending bulkhead 36 extends to the vertical direction along the rear bending portion 34, joins the lower wall 30, the inside wall 31, and the outside wall 32 which forms the rear bending portion 34, respectively, and increases the rigidity of the rear bending portion 34.

Moreover, as mentioned above, the rear wall 104a of the lateral member 104 is joined to the inside of the inside wall 31 of the rear bending portion 34 in the width direction of the vehicle, a stiffener 103d of the outrigger 103 is joined to the outside of the outside wall 32 of the rear bending portion 34 in the width direction of the vehicle.

According to the above-mentioned configuration, as shown in FIG. 1, the bending bulkhead 36 is configured such that the rear wall 104a of the lateral member 104, the bending bulkhead 36, and the stiffener 103d are aligned in the width direction of the vehicle, the rigidity of the rear bending portion 34 (the second angular portion 1B) extremely increases.

Accordingly, it is suppressed that the collision load from the front direction makes the rear bending portion 35 of the rear frame 3 smaller to deform the dash lower panel 111 to the inside of the vehicle.

Namely, it can be suppressed that an angle θ2 (see FIG. 2) of the second angular portion becomes smaller when the collision load, is applied from, the front direction.

As mentioned above, according to the embodiment, when, the vehicle 100 is collided from the front direction of the vehicle, as shown in FIG. 3, the front frame 2 of the front side frame 1 bends in a bellow shape to the outside or the inside in the width direction of the vehicle at the three points (the clearance portion 14, the front bending portion 15, and the recessed portion 16) and absorbs the collision energy, which improves the absorbing ability of the front side frame 1.

Moreover, according to the embodiment, as shown in FIG. 2, due to the fact that the angle θ1 of the first angular portion 1A and the angle θ2 of the second angular portion 1B can be kept, the dash lower panel 111 does not move to the inside of the vehicle, which increase the safety.

In detail, when the angle θ1 of the first angular portion 1A and the angle θ2 of the second angular portion 1B become smaller, respectively, the front frame 2, the inclined portion 33, and the horizontal portion 35 are deformed so as to make a right angle. Accordingly, the dash lower panel 111 is lifted upward to the rear side, which may contact the driver and the like.

Moreover, in FIG. 2, the two-dot chain line M2 shows the front frame 2 after the deformation, a two-dot chain line M33 shows the inclined portion 33 after the deformation, the two-dot chain line M111 shows the dash lower panel 111 after moving to the inside of the vehicle.

According to the embodiment, the dash lower panel 111 hardly moves to the inside of the vehicle, which increase the safety.

As mentioned above, the present embodiment has been explained. However, the present invention is not limited to the example explained in the embodiment.

The front bulkhead 50 of the present embodiment is not joined to the outside wall 9, however, it is not limited to this. For example, the front bulkhead 50 may be welded to the outside wall 9 forming the front portion of the second straight line portion 12. If the rigidity of the recessed portion 16 is not improved, the front bulkhead 50 may be joined to the outside wall 3.

Moreover, in the present embodiment, a lateral wall 62 is welded to the lower wall 30 of the rear frame 3. The present invention is not limited to this. The lateral wall 62 may not be welded to the lower wall 30 of the rear frame 3. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body-front structure comprising:
a front side frame provided at a front portion of a vehicle body,
said front side frame including
a front frame extending in a longitudinal direction of the vehicle body,
and a rear frame extending downward and rearward from a rear-end portion of said front frame,
wherein the front frame has a rear portion including
a front, bulkhead and a rear bulkhead which are longitudinally spaced apart from each other,
and a recessed portion including an outside wall disposed outside in a vehicle width direction of the vehicle body and recessed inward in the vehicle width direction,
and said recessed portion is positioned between said front bulkhead and said rear bulkhead.

2. The vehicle body front structure according to claim 1, wherein
a mount bracket attaching a sub frame is provided to a lower portion of said front frame at a position under said front bulkhead,
said front bulkhead has an approximately C-shape in plan view, and
the front bulkhead extends in a vertical direction, and is connected at least to a lower wall, an upper wall, and an inner side wall which constitute said front frame.

3. The vehicle body front structure according to claim 1, wherein
said rear, bulkhead is a substantially L-shaped member in side view, comprising a vertical wall disposed in the rear portion of said front frame and extending in a substantially vertical direction,
a lateral wall extending downward and backward from a lower end of said vertical wall,
said vertical wall is connected to an upper wall, a lower wall, an inner side wall, and the outside wall which constitute said front frame, respectively,
and said lateral wall is connected to at least an outside wall, and an inner side wall which constitute said rear frame.

4. The vehicle body front structure according to claim 3, wherein
the rear bulkhead includes a bead extending over said vertical wall and said lateral wall.

5. The vehicle body front structure according to claim 1, wherein
said front frame includes, in order from the front,
a clearance portion avoiding contact with a wheel disposed outside in the vehicle width direction,
a front bending portion bending to the inside in the vehicle width direction,
and said recessed portion.

6. The vehicle body front, structure according to claim 1, wherein
a load transmitting member extending to the outside in the vehicle width direction is provided to a front end portion of said front frame.

7. The vehicle body front structure according to claim 1, wherein said rear frame comprises:
an inclined portion extending downward and rearward from the rear portion of said front frame;
a horizontal portion horizontally extending from a rear end of said inclined portion to a rear direction,
a rear bending portion including an angular portion disposed at a boundary between said inclined portion, and said horizontal portion,
a stiffener of an outrigger provided on an outer side in the vehicle width direction of said rear bending portion,
a rear wall of a lateral member provided on an inner side of said rear bending portion in the vehicle width direction,
a bending bulkhead provided inside said rear bending portion and aligned with said stiffener and the rear wall of said lateral member in the vehicle width direction.

8. The vehicle body front, structure according to claim 1, wherein the recessed portion, is positioned longitudinally between said front bulkhead and said rear bulkhead.

9. The vehicle body front structure according to claim 1, wherein the recessed portion is recessed into a space between the front bulkhead and the rear bulkhead.

10. The vehicle body front structure according to claim 2, wherein the front bulkhead is joined to the outside wall.

11. The vehicle body front structure according to claim 2, wherein the front bulkhead is not joined to the outside wall.

12. The vehicle body front structure according to claim 3, wherein the vertical wall includes an outside vertical wall joined to the outside wall of the front frame and the outside wall of the rear frame.

13. A vehicle comprising the vehicle body front structure according to claim 1.

* * * * *